United States Patent [19]
Medley

[11] 4,427,097
[45] Jan. 24, 1984

[54] BRAKE DRUM
[75] Inventor: Jackson C. Medley, Brimfield, Ill.
[73] Assignee: Kress Corporation, Brimfield, Ill.
[21] Appl. No.: 235,841
[22] Filed: Feb. 19, 1981
[51] Int. Cl.³ .............................................. F16D 65/10
[52] U.S. Cl. .............................. 188/218 R; 188/18 R; 192/DIG. 1; 301/6 W
[58] Field of Search .......................... 188/18 R, 218 R; 192/DIG. 1; 74/450; 301/6 R, 6 W, 6 S, 6 J

[56] References Cited
U.S. PATENT DOCUMENTS

| 124,581 | 3/1872 | Jacobs . | |
|---|---|---|---|
| 265,262 | 10/1882 | Howe . | |
| 1,342,687 | 6/1920 | Melanowski | 301/6 W |
| 1,604,852 | 10/1926 | Powell . | |
| 1,745,301 | 1/1930 | Johnston | 188/218 A |
| 1,935,392 | 11/1933 | Coninck | 188/218 R |
| 1,974,905 | 9/1934 | Walker | 188/218 R |
| 2,187,988 | 1/1940 | Anderson . | |
| 2,190,052 | 2/1940 | Raalte | 301/6 R |
| 2,289,166 | 7/1942 | Ash | 188/18 R |
| 2,552,081 | 5/1951 | Ash | 301/6 R |
| 2,808,134 | 10/1957 | Ragland . | |

FOREIGN PATENT DOCUMENTS

| 466523 | 10/1928 | Fed. Rep. of Germany ... | 188/218 R |
|---|---|---|---|
| 1021736 | 12/1957 | Fed. Rep. of Germany ... | 188/218 R |
| 475562 | 11/1937 | United Kingdom ............ | 188/218 R |

Primary Examiner—George E. A. Halvosa
Attorney, Agent, or Firm—Leydig, Voit, Osann, Mayer & Holt, Ltd.

[57] ABSTRACT

A two piece brake drum for large off-the-road type vehicles having large and difficult-to-remove wheels, the brake drum comprising two substantially semi-circular halves with integral flanges for mounting to a wheel. The internal friction surfaces terminate in chamfers at each end and the halves, when mounted to a wheel, have gaps between the ends through which foreign material may be expelled.

2 Claims, 4 Drawing Figures

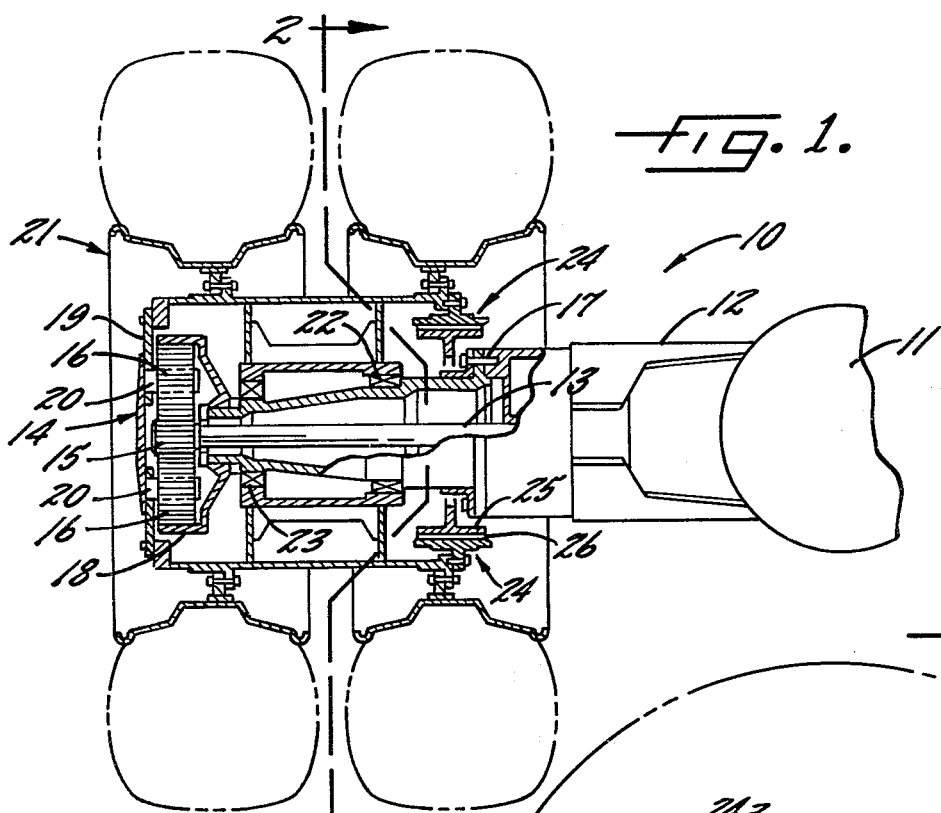
fig. 1.
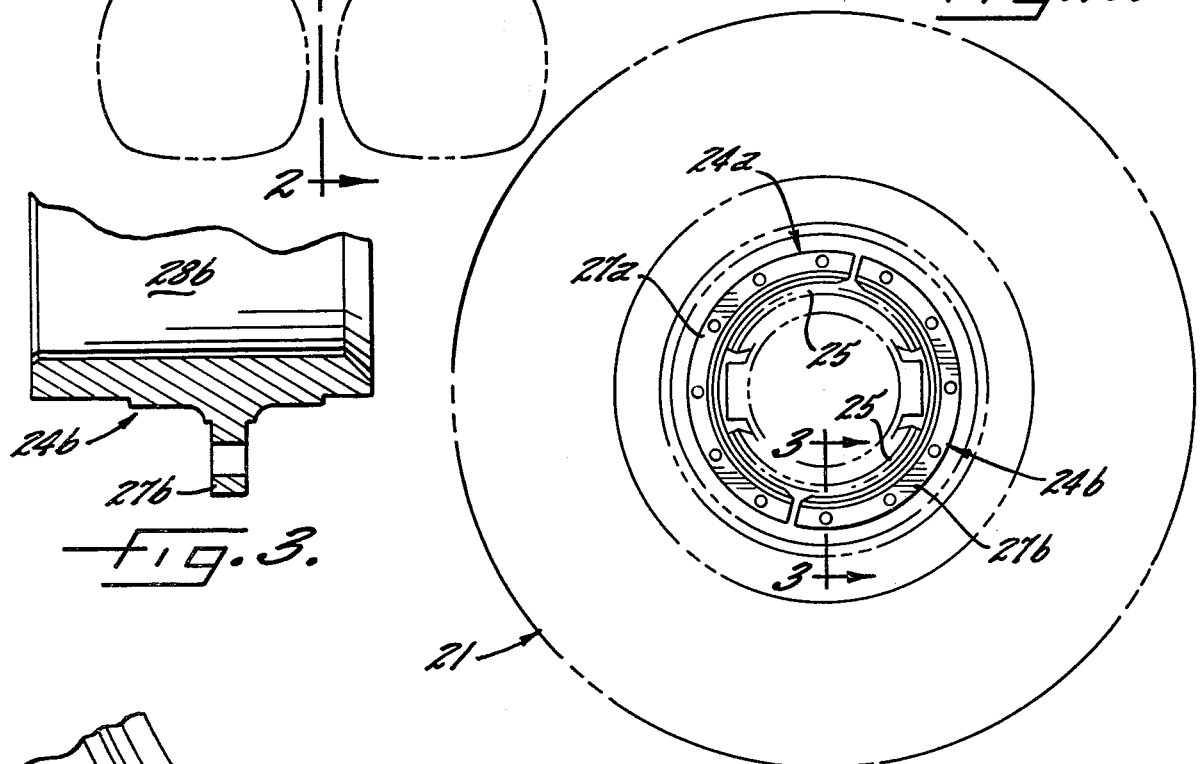
fig. 2.
fig. 3.
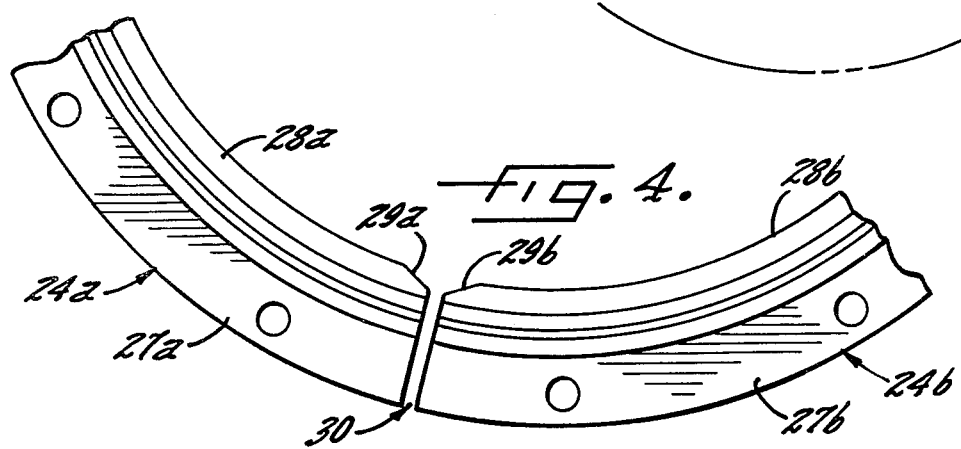
fig. 4.

BRAKE DRUM

This invention relates to brake drums for vehicles, especially brake drums for large, off-the-road type vehicles having large and difficult-to-remove wheels. On smaller vehicles, the brake mechanisms are typically mounted inboard of the wheels. In conventional inboard drum and expanding shoe arrangements the drums and shoes may be serviced by jacking up the vehicle and removing the wheel to expose the brake components. On larger vehicles, however, the bulk of the vehicle as a whole and that of the wheels themselves render it more difficult to simply jack up the vehicle and remove the wheel. Moreover, in very large, off-the-road type vehicles, the wheels hubs often contain drive and reduction gearing interposed between the drive axle and the wheels. The gearing and the bearings at the wheel hubs complicate the removal of the large wheels to an even greater extent. Some known wheel hub drive systems for large vehicles, especially electric motor drive systems, accommodate the mounting of the braking system outboard of the wheel, greating simplifying the braking system access problems noted above. It will be appreciated that in order to accommodate external mounting of the braking system, however, there must be a stationary, relative to the axle housing, component on which to mount the non-rotating brake elements. With a conventional drum and expanding shoe system, for example, the shoes are typically mounted to a portion of the axle housing and may be shifted radially outwardly to interact with a surface of a rotating brake drum.

Some drive systems, however, despite offering other advantages, do not permit access from outboard of the wheel to a stationary component, i.e., a portion of the axle housing. Specifically, certain wheel hub planetary drive systems for very large off-the-road type vehicles provide no access from the outboard side of the wheel to a stationary part of the axle housing to which to mount the stationary braking element, e.g., the brake shoes. In the past the use of such drive systems has necessitated the time consuming and difficult removal of the wheels and possibly other components in order to fully service the braking system.

A further disadvantage of known braking systems for off-the-road type vehicles is the retention of grit and foreign matter in and around the cooperating frictional surfaces of the brake drum and the brake shoes, often causing excessive premature wear of these components during the engagement of the shoes with the drum.

A primary object of the present invention is to provide a braking system for vehicles which may be mounted inboard of the wheels but which does not require removal of the wheels to service the brakes and even remove the brake drums.

A further object of the present invention is to provide a braking system which accommodates expulsion of foreign particles from between the brake shoes and the brake drum.

These and other objects and advantages of the invention will become apparent upon reading the following detailed description and upon reference to the drawings in which:

FIG. 1 is a partial sectional view along the axis of a wheel and drive system incorporating a braking system according to the present invention;

FIG. 2 is a sectional view along line 2—2 of FIG. 1 and showing a brake drum according to the present invention;

FIG. 3 is an enlarged sectional view along lines 3—3 of FIG. 2;

FIG. 4 is an enlarged view of a portion of the brake drum according to the present invention as embodied in FIGS. 1-3.

While the invention is susceptible of various modifications and alternative forms, a specific embodiment has been shown by way of example in the drawings and will hereinafter be described in detail. It should be understood, however, that it is not intended to limit the invention to the particular form disclosed, but to the contrary, this invention is to cover all modifications, equivalents and alternatives falling within the spirit and scope of the invention is expressed in the appended claims.

Referring to FIG. 1, one side of an axle and wheel driving assembly 10 is shown. The assembly comprises a differential housing 11 and an axle housing 12 through which passes a driven axle 13. The axle 13 trims a wheel hub drive subassembly 14. Briefly describing the operation of the wheel hub drive subassembly 14, the axle 13 terminates in a drive gear 15 which drives three planetary gears 16. The action of the drive gear 15 causes the planetary gears 16 to orbit within a ring gear housing 18 fixed to the axle housing 12. The orbiting of the planetary gears 16 effects the driving of the final drive spider 19, having three stub shafts 20 to which the planetary gears are rotatably mounted. The final drive spider 19 is fixed to and drives the wheel and tire subassembly 21, which is journaled to the axle housing 12 via bearings 22 and 23. This arrangement results in a final gear reduction at the wheel hub to provide the high torques required for driving large off-the-road vehicles.

It should be noted that in the axle and wheel driving assembly 10 there is no stationary, relative to the axle housing 12, component accessible from outboard of the wheel hub drive subassembly 14 to which to mount braking system components. Accordingly, the brake mechanism must be inboard of the wheel hub drive subassembly 14. It will be further appreciated that it would be relatively difficult to remove the wheel and tire subassembly 21 from axle housing 12, requiring the separate removal of the final drive spider 19, the planetary gears 16 and the ring gear housing 18 before allowing the wheel and tire subassembly 21 to be shifted axially outboard off the bearings 22 and 23. Alternatively, the axle might be in two pieces, splined together such that the outer portion of the axle housing i.e. from bolts 17 outward, might be removed without disturbing the wheel hub drive subassembly 14 or the mounting of the wheel and tire subassembly 21. One would still be faced with the problems, however, of supporting the remainder of the vehicle and of handling the unit comprising the axle housing protion, the wheel hub drive subassembly 14 and wheel and tire subassembly 21.

A brake drum 24 according to the present invention is mounted to the wheel subassembly 21 inboard of the bearings 22 and 23. Conventional brake shoes 25 with friction pads 26 are mounted to the axle housing 12 and may be selectively shifted radially outward by a conventional mechanism (not shown) such that the friction surfaces of the shoes pads engage the internal annular friction surface of the drum to result in a braking action.

The brake drum 24 is shown in elevation in FIG. 2. In carrying out the invention, the brake drum 24 is fabricated in two semi-circular halves 24a and 24b having integral flanges 27a and 27b (see FIG. 3) which may be bolted directly to the wheel and tire subassembly 21. This arrangement offers the significant advantage of permitting removal of the brake drum halves 24a and 24b, or either of them, without disturbing the mounting of the wheel and tire subassembly 21 to the axle housing 12. Moreover, with the integral flanges 27a and 27b bolted to the wheel and tire subassembly 21, the latter provides the requisite hoop strength to prevent the spreading of the brake drum halves under the outwardly directed forces generated by the brake shoes against the friction surfaces 28a and 28b.

Another feature of the invention is illustrated in FIG. 4, which is an enlarged partial elevation of the brake drum of FIGS. 1—3 in one of the two diametrically opposed areas where the two semi-circular halves 24a and 24b meet. As shown, the two halves 24a and 24b each have chamfers (29a and 29b, respectively) and a circumferential gap 30 is left between the two halves. These chamfers 29a and 29b and the gap 30, and those corresponding at the diametrically opposite location, are particularly useful in providing an opening between the friction surfaces 28a and 28b of the brake drum to accommodate the expulsion of any grit and foreign material which might otherwise be trapped between the brake shoes and the drum and cause excessive, premature wear. This feature is especially important in the case of large off-the-road vehicles which must operate on unpaved surfaces. It is noted that even though a dirt shield in the form of an annular plate may be placed just inboard of the brake drum, mounted to either the wheel and tire subassembly 21 for rotation therewith or to the axle housing 12, it is likely that some dirt might still enter into the braking system, such that the gaps 30 would continue to serve a highly beneficial function.

I claim:

1. An improved brake drum for use in a braking system comprising a brake drum, expanding brake shoes positioned within the brake drum and means for shifting the brake shoes radially outwardly to establish frictional contact with the brake drum, the improved brake drum comprising two substantially semicircular halves, each half comprising an inwardly-facing semicircular frictional surface and an integral, outwardly-directed flange opposite an intermediate portion of the frictional surface, the flange having a plurality of axial holes therethrough to permit each of the brake drum halves to be directly and independently mounted to a continuous, circular wheel to derive hoop strength therefrom, means cooperating with said axial holes mounting said halves to said circular wheel the frictional surfaces terminating in chamfers at each end and the halves being sized to leave gaps therebetween through which grit and foreign material may be expelled.

2. An improved brake drum for use in a braking system comprising a brake drum, expanding brake shoes positioned within the brake drum and means for shifting the brake shoes radially outwardly to establish frictional contact with the brake drum, the improved brake drum comprising at least two arcuate elements, the arcuate elements together forming a substantially circular brake drum, each element comprising an inwardly-facing arcuate frictional surface and an integral, outwardly-directed flange opposite an intermediate portion of the frictional surface, the flange having a plurality of axial holes therethrough to permit each of the brake drum elements to be directly and independently mounted to a continuous, circular wheel to derive hoop strength therefrom, means cooperating with said axial holes mounting said arcuate elements to said circular wheel, the frictional surfaces terminating in chamfers at each end and the elements being sized to leave gaps therebetween through which grit and foreign material may be expelled.

* * * * *